(12) United States Patent
Hwang et al.

(10) Patent No.: US 11,677,284 B2
(45) Date of Patent: Jun. 13, 2023

(54) IPM BLDC MOTOR

(71) Applicant: Samsung Electronics Co., Ltd., Suwon-si (KR)

(72) Inventors: Incheol Hwang, Suwon-si (KR); Dongbum Lee, Suwon-si (KR); Jonghyun Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/954,638

(22) PCT Filed: Dec. 18, 2018

(86) PCT No.: PCT/KR2018/016164
§ 371 (c)(1),
(2) Date: Jun. 17, 2020

(87) PCT Pub. No.: WO2019/124950
PCT Pub. Date: Jun. 27, 2019

(65) Prior Publication Data
US 2020/0313479 A1  Oct. 1, 2020

(30) Foreign Application Priority Data
Dec. 20, 2017  (KR) .......................... 10-2017-0176404

(51) Int. Cl.
*H02K 1/27* (2022.01)
*H02K 1/276* (2022.01)
(Continued)

(52) U.S. Cl.
CPC ............. *H02K 1/276* (2013.01); *H02K 21/14* (2013.01); *H02K 29/03* (2013.01); *H02K 2213/03* (2013.01)

(58) Field of Classification Search
CPC ........ H02K 1/276; H02K 21/14; H02K 29/03; H02K 2213/03; H02K 1/2766; H02K 1/16; H02K 1/27; H02K 29/00
See application file for complete search history.

(56) References Cited

U.S. PATENT DOCUMENTS

| 9,647,501 B2 | 5/2017 | Nigo et al. | |
|---|---|---|---|
| 2010/0084937 A1* | 4/2010 | Horst | H02K 1/276 |
| | | | 310/156.01 |
| 2014/0175932 A1* | 6/2014 | Huang | H02K 1/246 |
| | | | 310/156.38 |

(Continued)

FOREIGN PATENT DOCUMENTS

| CN | 203219035 U | 9/2013 |
|---|---|---|
| EP | 2 741 402 A1 | 6/2014 |

(Continued)

OTHER PUBLICATIONS

Extended European Search Report dated Oct. 30, 2020, in corresponding European Patent Application No. 18892685.1.

(Continued)

*Primary Examiner* — Thomas Truong
(74) *Attorney, Agent, or Firm* — Staas & Halsey LLP (57) ABSTRACT

A BLDC motor server includes a stator configured in a hollow cylindrical shape and comprising a plurality of teeth around which a plurality of coils is wound to form an electromagnetic field, respectively; and a rotor configured in a cylindrical shape rotatable within the stator and comprising a plurality of permanent magnets, each having an arched section in which an outer circumference side is extended in both directions from a rotation center side, wherein the plurality of permanent magnets is disposed, so that facing outer surface portions of two permanent magnets neighboring each other are adjacent to each other, and wherein a width Wo of the outer circumference side of each permanent magnet is configured to be smaller than a width Wc of the (Continued)

rotation center side thereof. The BLDC motor may reduce a noise and a vibration as well as increasing an efficiency of the motor.

5 Claims, 10 Drawing Sheets

(51) Int. Cl.
  *H02K 21/14* (2006.01)
  *H02K 29/03* (2006.01)

(56) References Cited

U.S. PATENT DOCUMENTS

| | | | |
|---|---|---|---|
| 2015/0137629 A1 | 5/2015 | Chowdhury et al. | |
| 2015/0372548 A1* | 12/2015 | Nigo | H02K 1/2773 310/156.01 |
| 2017/0018980 A1 | 1/2017 | Yang et al. | |

FOREIGN PATENT DOCUMENTS

| | | |
|---|---|---|
| JP | 2005-20991 A | 1/2005 |
| JP | 2006-325348 A | 11/2006 |
| JP | 2014-82882 | 5/2014 |
| JP | 2014-525232 A | 9/2014 |
| JP | 2014-204561 | 10/2014 |
| JP | 2014-241705 | 12/2014 |
| JP | 2016-82778 A | 5/2016 |
| JP | 2016-100927 A | 5/2016 |
| JP | 2016-131491 A | 7/2016 |
| JP | 2016-171646 A | 9/2016 |
| JP | 2016171646 A * | 9/2016 |
| KR | 10-1245592 | 3/2013 |
| KR | 10-1295059 B1 | 8/2013 |
| WO | WO 2014/125599 | 2/2017 |

OTHER PUBLICATIONS

Communication pursuant to Article 94(3) EPC dated Mar. 9, 2021, in corresponding European Patent Application No. 18 892 685.1.
Office Action dated Sep. 13, 2022, issued in Korean Application No. 10-2017-0176404.
Office Action dated Jan. 26, 2023, in European Application No. 18 892 685.1.
Office Action dated Jan. 30, 2023, in Korean Application No. 10-2017-0176404.

* cited by examiner

IPM BLDC MOTOR

CROSS-REFERENCE TO RELATED APPLICATIONS

This application is a U.S. National Stage Application which claims the benefit under 35 U.S.C. § 371 of International Patent Application No. PCT/KR2018/016164 filed on Dec. 18, 2018, which claims foreign priority benefit under 35 U.S.C. § 119 of Korean Patent Application 10-2017-0176404 filed on Dec. 20, 2017 in the Korean Intellectual Property Office, the contents of both of which are incorporated herein by reference.

TECHNICAL FIELD

Apparatuses consistent with embodiments relate to an interior permanent magnet (IPM) brushless direct current (BLDC) motor, and more particularly, a modification of rotor configuration in an IPM BLDC motor.

BACKGROUND ART

Generally, a permanent magnet buried type synchronous motor includes a hollow cylindrical stator around which a plurality of coils is wound, and a cylindrical rotor having a certain gap concentrically arranged in the hollow cylindrical stator. The rotor rotates while being spaced apart from an inner circumference of the stator. The stator has a plurality of teeth arranged toward the inner circumference thereof, and a stator slot part is formed between the teeth. The plurality of coils are wound on the plurality of teeth, respectively. Permanent magnets having poles different from each other are alternatively buried at given intervals in a circumferential direction within the cylindrical rotor. The permanent magnets are inserted into magnet slots formed in the rotor.

In the permanent magnet buried type synchronous motor composed as described above, if the plurality of coils wound on the plurality of teeth of the stator is successively applied with current, the rotor generates a rotating magnetic field on the teeth of the stator formed between stator slots as the polarity of the coils changes sequentially. On the other hand, the rotor generates a magnetic field by means of the permanent magnets arranged opposite to the teeth of the stator. If the polarity of the rotating magnetic field generated on the teeth of the stator is the same as that generated by the permanent magnets, a reaction force is generated therebetween, and if they are different from each other, an attraction force is generated therebetween. The rotor generates a force to rotate by the reaction force and the attraction force, thereby revolving around a rotation axis thereof.

To meet a recent command of highly efficient motor, a BLDC motor in which a plurality of C-shaped permanent magnets, each having a given thickness in a redial direction with respect to a center point thereof, is buried is being much used.

The permanent magnets (slots) of such a structure consist of permanent magnets of high quality material as a way for increasing an effective magnetic flux. However, there is a problem in that the permanent magnets of high quality material significantly increase manufacturing cost as a content of rare earth material included therein is rapidly increased.

Also, to increase the effective magnetic flux, a way of increasing an overall thickness of permanent magnets, may be applied. However, this way may result in a problem of reducing an efficiency and an operation performance of the motor, in that an absolute magnetic flux of the permanent magnets is increased, but a core loss is increased due to a reduction of route (magnetic path) going on to the stator, a magnetic dead zone, which does not generate a magnetic flux in a radial direction among the gap of the rotor, is increased, a cogging torque is increased, and a total harmonic distortion (THD) of counter electromotive force gets higher.

DISCLOSURE

Technical Problem

Embodiments provide a BLDC motor, which improves a torque ripple and a THD of counter electromotive force as well as increasing an effective magnetic flux for reducing a cooper loss, thereby to improve an efficiency and an operation performance.

Technical Solution

According to an embodiment, a BLDC motor is provided. The BLDC motor includes: a stator configured in a hollow cylindrical shape and comprising a plurality of teeth around which a plurality of coils is wound to form an electromagnetic field, respectively; and a rotor configured in a cylindrical shape rotatable within the stator and comprising a plurality of permanent magnets, each having an arched section in which an outer circumference side is extended in both directions from a rotation center side. The plurality of permanent magnets is disposed, so that facing outer surface portions of two permanent magnets neighboring each other are adjacent to each other. A width Wo of the outer circumference side of each permanent magnet is configured to be smaller than a width Wc of the rotation center side thereof. The permanent magnets of the BLDC motor are configured, so that a rotation center side middle part of each permanent magnet becomes thick, and an area of active regions, which are formed by an inner surface portion of each permanent magnet extended in both directions toward an outer circumference of the rotor, becomes wide and large, thereby increasing a amount of magnetic flux and reducing a torque ripple and a THD of counter electromotive force.

An inclination of an inner surface portion of each permanent magnet may be configured to be smaller than that of an outer surface portion thereof.

The stator may include a stator slot part provided with a slot opening part, which is disposed by two adjacent teeth of the stator and opened toward the rotation center, and in a state in which a rotation center side middle part of one permanent magnet is aligned with a center of one tooth of the plurality of teeth, at least one point at which a line extended from an inner surface portion of the one permanent magnet intersects with an outer circumference of the rotor may be configured to be located between two lines, which connects from the rotation center of the rotor to both ends of the slot opening part located on both sides of the tooth, respectively.

A width Wo of both ends of each permanent magnet may include a length L1 of segment from at least one point at which a line extended from an inner surface portion of each permanent magnet meets with an outer circumference of the rotor to at least one point at which a line extended from an outer surface portion of each permanent magnet meets with the outer circumference of the rotor, respectively.

The width Wo of both ends of each permanent magnet may be configured to satisfy the following formula 1:

$$Wo=\sqrt{(2R \times R - 2 \times R \times \cos(\theta t - \theta m/2))}$$

Here, θm is 360/P, θt is 360/S, R is a radius of the rotor, P is a number of poles of the rotor, and S is a number of stator slots.

A width Wc of a middle part of each permanent magnet may be configured to satisfy the following formula 2:

$$Wc > Wo \times 1.0$$

The width Wc of the middle part of each permanent magnet may be configured to satisfy the following formula 3:

$$Wc < Wo \times 1.6$$

Based on an extended line of passing through the middle part of each permanent magnet from the rotation center O of the rotor, a maximum width Sw of each permanent magnet may be configured to satisfy the following formula 4:

$$Sw=\sqrt{(2R \times R - 2R \times R \times \cos(\theta m))}$$

Here, θm is 360/P, and R is a radius of the rotor.

Based on the extended line of passing through the middle part of each permanent magnet from the rotation center of the rotor, a maximum height Sh of each permanent magnet may be configured to satisfy the following formula 5:

$$Sh=(0.45{\sim}0.55) \times Sw$$

According to another embodiment, a BLDC motor includes: a stator configured in a hollow cylindrical shape and comprising a plurality of teeth around which a plurality of coils is wound to form an electromagnetic field; and a rotor configured in a cylindrical shape rotatable within the stator and comprising a plurality of permanent magnets, each having an arched section in which an outer circumference side is extended in both directions from a rotation center side, wherein the plurality of permanent magnets is disposed, so that facing outer surface portions of two permanent magnets neighboring each other are adjacent to each other, and a maximum height Sh of each permanent magnet is configured to be 0.45~0.55 times as much as a maximum width Sw of each permanent magnet.

Advantages Effects

As described above, according to the embodiments, the BLDC motor improves an efficiency and an operation performance of the motor, in that by magnifying the route (magnetic path) going on to the stator as much as possible while the absolute magnetic flux of the permanent magnets is increased, the core loss is reduced, the magnetic flux dead zone is reduced, the cogging torque is reduced, and the THD of counter electromotive force is improved.

BEST MODE

Below, embodiments will be described in detail with reference to accompanying drawings for those skilled in the art to work the present disclosure without difficulty. The embodiments may be achieved in various forms, and are not limited to the embodiments provided herein. To clearly describe the embodiments, denote like elements throughout this disclosure.

Hereinafter, a construction of a brushless direct current (BLDC) motor 1 according to an embodiment will be described by reference to accompanying drawings.

To complement a life depreciation and an electrical fault generated in a related art DC motor as it is operated by a mechanical switching of a brush, a commutator and the like, the BLDC motor 1 is configured to change the mechanical switching of the brush, the commutator and the like into an electronic switching by using semiconductor elements.

The BLDC motor 1 according to an embodiment includes a stator 10 around which a coil for applying power is wound, a rotor 20 rotatably inserted in the stator 10 while being spaced apart by a given gap G therefrom, and a rotation axis 25 connected to a center of the rotor 20 to transmit a rotary force of the rotor 20. Also, although there are not shown in FIGS. 1 and 2, the BLDC motor 1 may further include a housing configured to protect the stator 10 and rotor 20, and at least one bearing disposed between the housing and the rotation axis 25 to support the rotation axis 25. The stator 10 may include a plurality of winding coils wound around the rotor 20. The BLDC motor 1 includes a power supply unit, and a switching unit (not shown) configured to receive power from the power supply unit to supply to the plurality of winding coils.

The power supply unit may be a general three phase power unit. The three phase power unit converts a DC power rectified via a rectifier circuit, which is composed of a general rectifier and a general smoothing condenser to rectify and smooth an alternating current (AC) power thus to supply the DC power, into a three phase alternating current power in a pulse form having a certain variable frequency.

The switching unit may be composed of a plurality of switching elements. The switching unit supplies the power supplied from the power supply unit, to the stator 10 as the plurality of switching elements is turned on/off.

Figure 1:
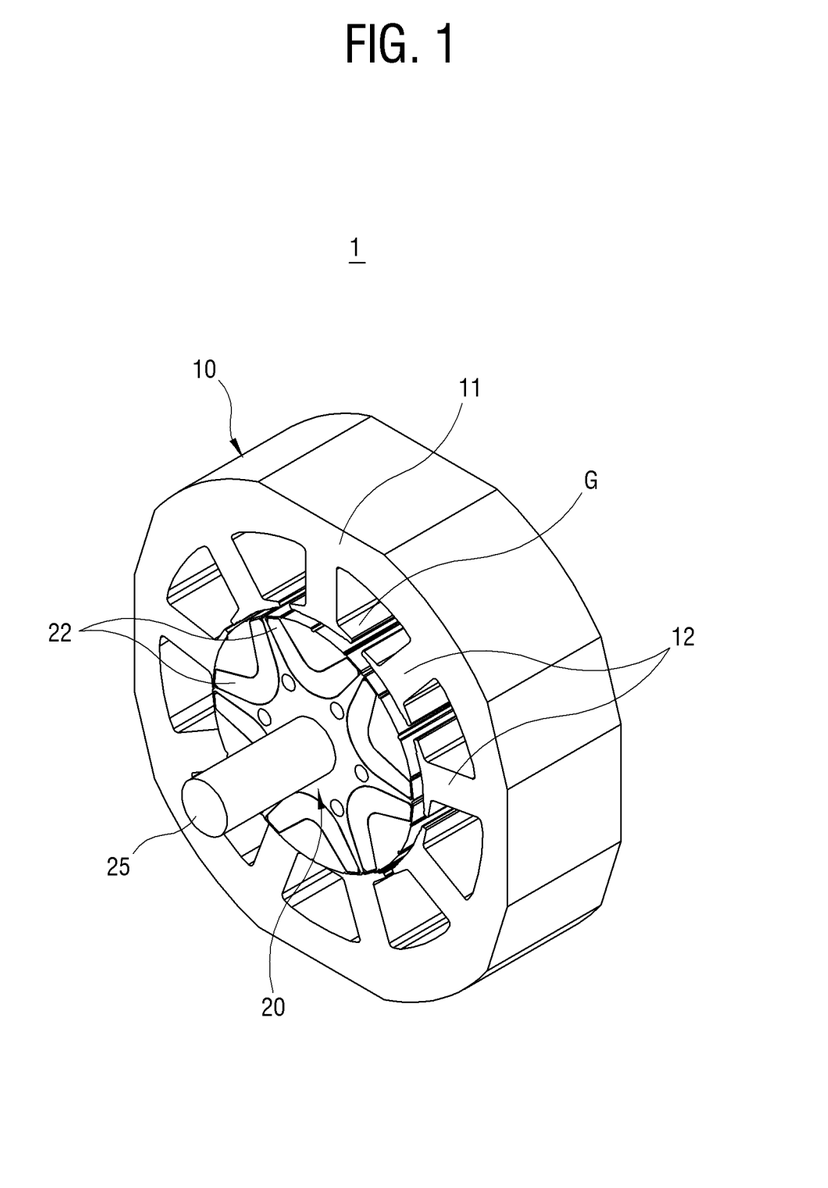
FIGS. 1 to 4 are a perspective view, an exploded perspective view, a sectional view and a partial magnification sectional view showing an IPM BLDC motor according to an embodiment, respectively.
Figure 2:
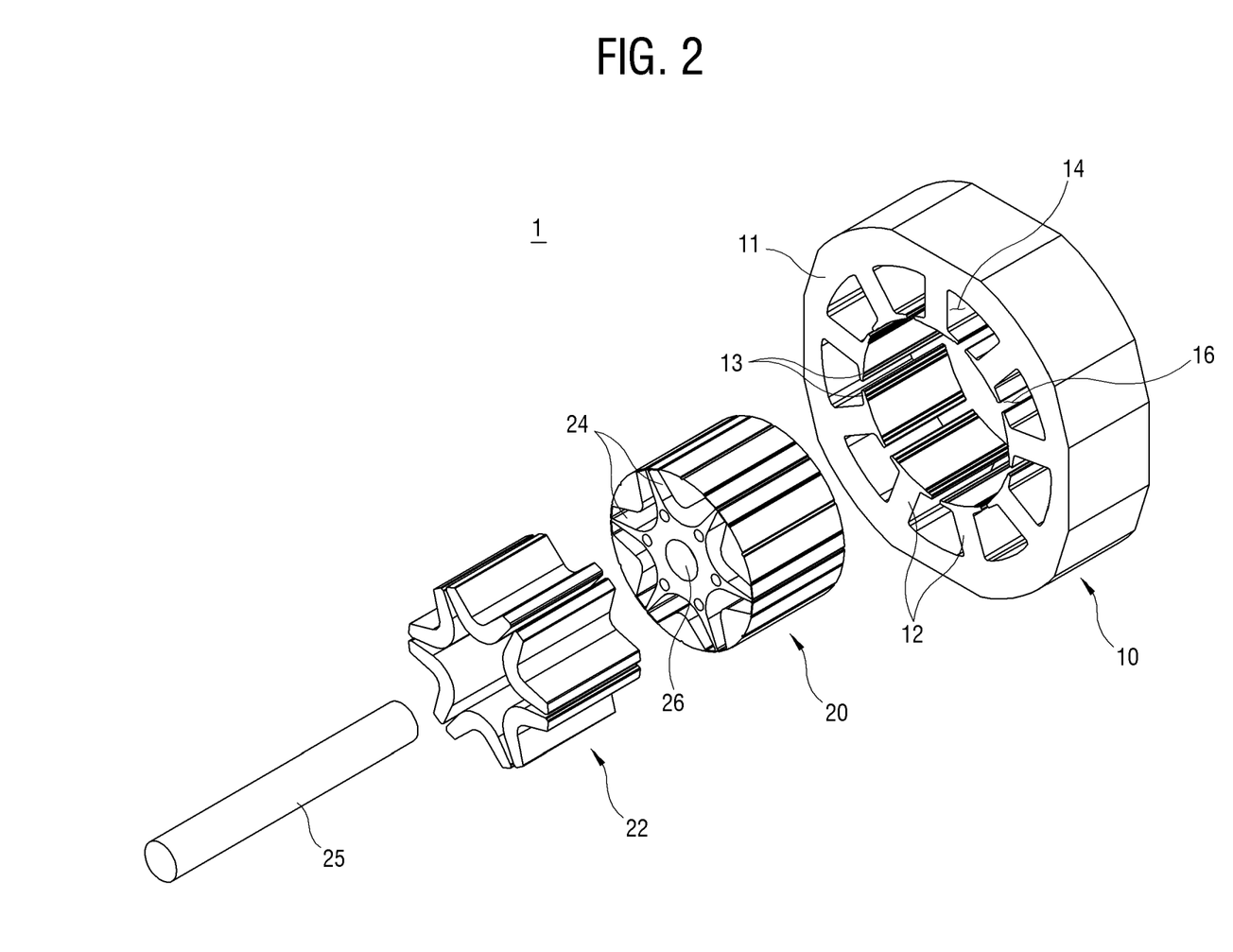
Figure 3:
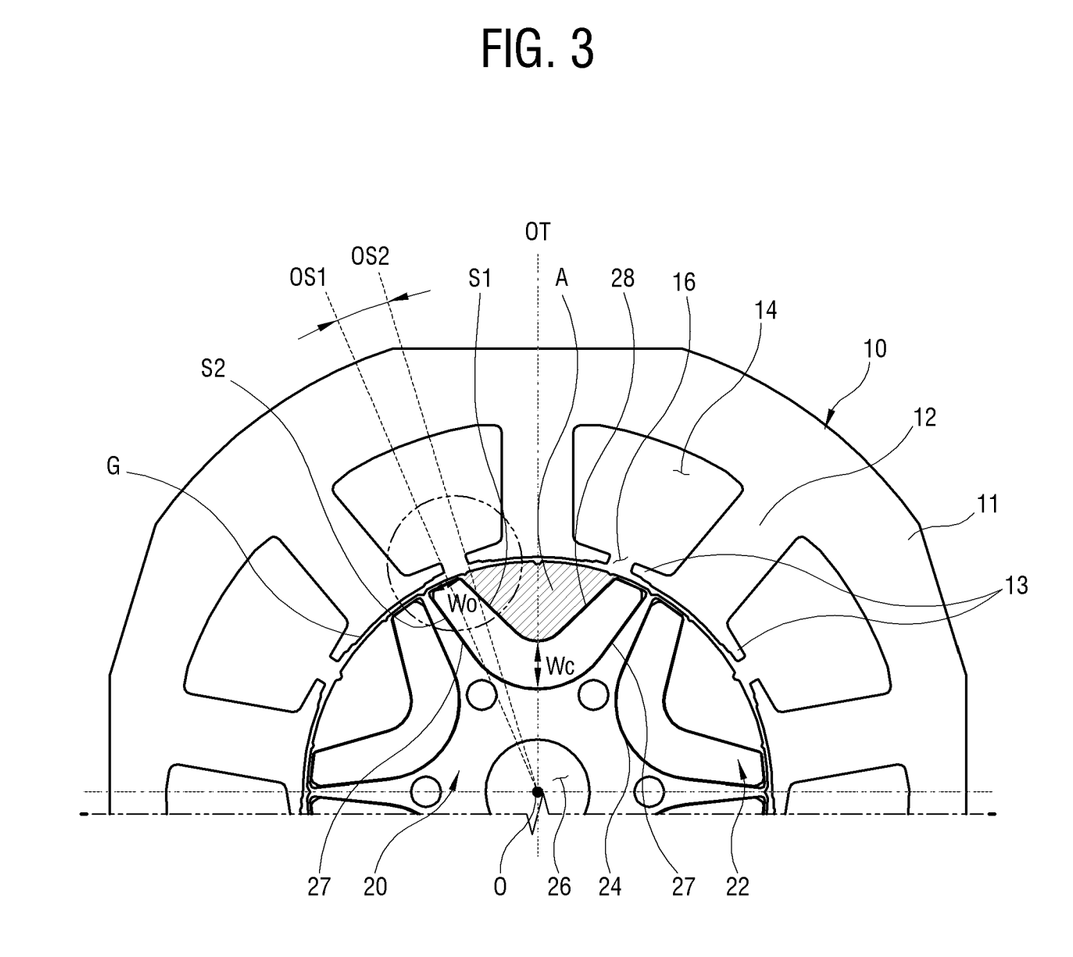

The BLDC motor 1 may further include a controller (not shown) for drive control as a system FIGS. 1 to 3 are a perspective view, an exploded perspective view, and a sectional view of the IPM BLDC motor 1 according to an embodiment, respectively. As shown in the drawings, although a six pole IPM BLDC motor 1 in which six permanent magnets 22 are applied is illustrated as an example, the present disclosure is not limited only to six poles.

The BLDC motor 1 includes the stator 10 configured to generate an electromagnetic field, and the rotor 20 in which the permanent magnets are buried and which is disposed in the stator 10 to be rotatable with respect to the stator 10. The electromagnetic field generated by the stator 10 is interacted with a magnetic field generated by the rotor 20 to generate a reaction force or an attraction force, thereby allowing the rotor 20 to revolve around the rotation axis.

The stator 10, as a stator iron core, includes a yoke 11, a plurality of teeth 12 configured to form a stator slot part 14, and a shoe part 13 formed on ends of the plurality of teeth 12. A coil (not shown) is wound many times around the plurality of teeth 12 and if current is applied to the coil, the electromagnetic field is generated.

The yoke 11 is formed in a ring form, so that the plurality of teeth 12 is projected toward a rotation center O from an inner circumference surface thereof. The yoke 11 has an outer circumference surface in a polygon form as shown in the drawings, but is not limited thereto and may have outer circumference surfaces in many different forms, such as a circle or the like.

The shoe part 13 is projected and extended in a circumferential direction from the ends of the plurality of teeth 12, so that the coil wound around the plurality of teeth 12 is prevented from being escaped therefrom. The stator slot part 14 are spaces for winding the coil around the plurality of teeth 12 and settling the wound coil therein. The stator 10 has a slot opening part 16, which is formed of two shoes 13 spaced apart from each other while facing each other and which is opened toward the rotation center O.

The rotor 20 is configured in a cylindrical shape and concentrically disposed with the stator 10 while being spaced apart by the gap G from the stator 10 therein. The rotor 20 includes an axis hole 26 in which the rotation axis is inserted at a center thereof, and six magnet slots in which six permanent magnets 22 are inserted. The rotor 20 may rotate about the rotation axis.

The permanent magnets 22 are made of at least one of alnico magnet, ferrite magnet, neodymium magnet or samarium cobalt magnet. Each of the permanent magnets 22 has an arched section and is inserted in each magnet slot of the rotor 20, so that a convex middle part is disposed toward the rotation center O and both ends are extended in both directions toward an outer circumference of the rotor. The magnet slots 24 are formed in the rotor 20 in advance to correspond to a shape of the permanent magnets 22. The plurality of permanent magnets 22 is disposed, so that two facing outer surface portions 27 of two permanent magnets neighboring each other are adjacent to each other. At this time, the two facing outer surface portions 27 may be configured to come in contact with each other or interpose an air gap or adhesive resin therebetween. Like this, as the two facing outer surface portions 27 of two permanent magnets neighboring each other are close to each other, active regions A formed by inner surface portions 28 of respective permanent magnets 22 may be obtained as large as possible.

The permanent magnets 22 arranged as described above generate magnetic fluxes in an orthogonal direction to the inner surface portions 28, so that the magnetic fluxes interact with electromagnetic field generated by the coil wound around the teeth 12 of the stator 10. The magnetic fluxes formed by the inner surface portions 28 of the permanent magnets 22 pass through the active regions A formed by the arch shaped inner surface portions 28 to advance to the outer circumference of the rotor 20.

In particular, the permanent magnets 22 are configured, so that a width Wo of outer circumference side both ends of each permanent magnet is smaller than a width Wc of a rotation center side middle part of each permanent magnet, thereby making the active regions A be larger. For this, the permanent magnets 22 are configured, so that an inclination S1 of the inner surface portions 28 is smaller than that S2 of the outer surface portions 27. As a result, the outer surface portions 27 are arranged as close as possible to neighboring permanent magnets and the width Wo of outer circumference side both ends of each permanent magnet are smaller than the width Wc of the rotation center side middle part of each permanent magnet, thereby making the active regions A be as large as possible. If the outer surface portions 27 and the inner surface portions 28 are not extended in a straight line, but with a curvature, it can make the inner surface portions 28 be different in curvature from the outer surface portions 27, thereby making the active regions A be as large as possible.

Since the active regions A are paths through which the magnetic flux passes, if they do not have sufficient spaces, even if the magnet fluxes are large, their effect is reduced due to saturation. As in efficiency comparisons shown in FIGS. 9 and 10, even though the motor 1 and a motor system according an exemplary have permanent magnets with small magnetic fluxes applied thereto, they have an efficiency higher than a motor of related art having permanent magnets with larger magnetic fluxes applied thereto.

Figure 4:
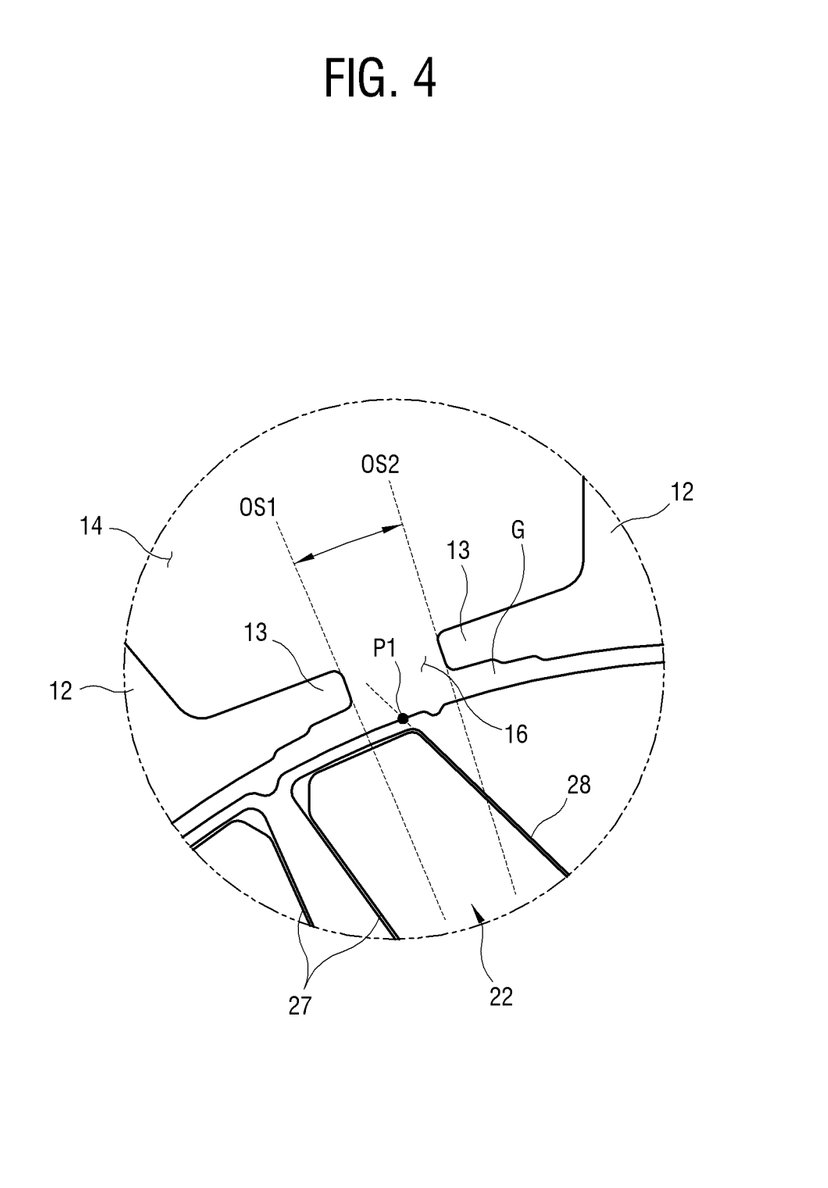

FIG. 4 is a partial magnification sectional view magnifying a border portion between the stator 10 and the rotor 20 according to an embodiment. FIG. 3 shows a state in which a center of one tooth 12 of the stator 11 is aligned with a rotation center O side middle part of one permanent magnet 22. At this time, as shown in FIG. 4, a point P1 at which a line extended from the inner surface portion 28 of one permanent magnet 22 toward the outer circumference of the rotor 20 intersects with the outer circumference of the rotor 20 is located between two lines 0S1 and 0S2, which connect from the rotation center O of the rotor to both ends of the slot opening part 16 located on both sides of the tooth 12, respectively. Here, it should be understood that for convenience, only one point among two points positioned with respect to both ends of the inner surface portion of the one permanent magnet is illustrated and explained.

Figure 5:
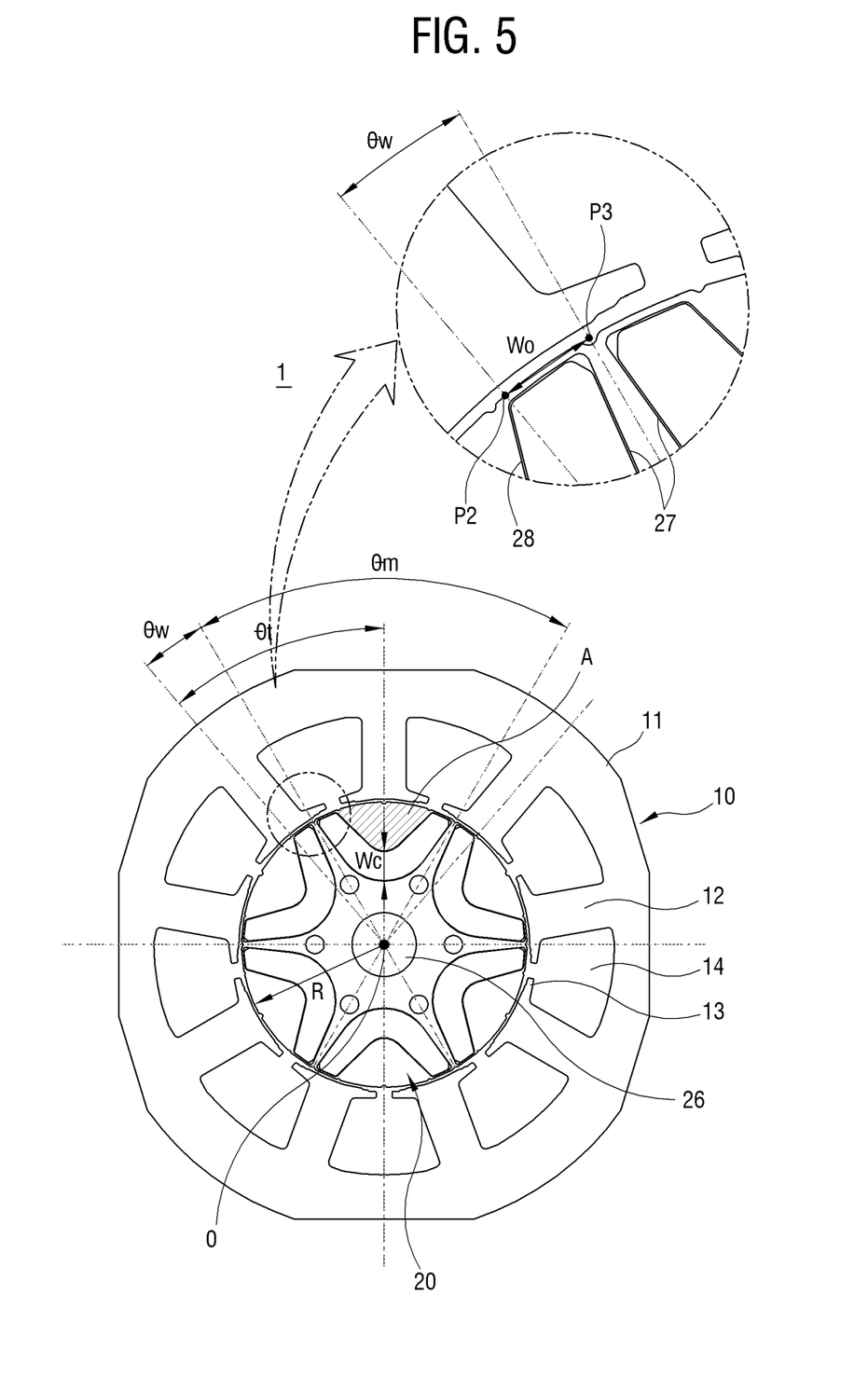
FIGS. 5 and 6 are sectional views showing a shape of a rotor of the IPM BLDC motor according to an embodiment, respectively.

FIG. 5 is a view showing a shape of a rotor 20 according to an embodiment. The permanent magnets 22 may be rounded at corners thereof in manufacturing. Assuming that two outer surface portions 27 of the neighboring permanent magnets 22 are in contact with each other, six permanent magnets correspond to nine teeth 12 of the stator. At this time, a width Wo of both ends of each permanent magnet 22 is configured to correspond to a length of segment, which connect two points P3 and P2 of the outer circumference of the rotor 20 with which a line extended from the outer surface portion 27 of each permanent magnet 22 and a line extended from the inner surface portion 28 thereof intersect, respectively, or a distance between the two points of the outer circumference of the rotor.

As described above, although the two outer surface portions 27 of the neighboring permanent magnets 22 are assumed as being in contact with each other, if a gap exists between the two outer surface portions 27, it may be considered. An angle θw made by lines connecting from the rotation center O to the two points P2 and P3 of the outer circumference of the rotor 20 becomes a value, which subtracts a half of an angle θm made by a maximum width of the permanent magnet 22 from an angle θt made by center lines of neighboring teeth 12 of the stator 10. If expressing it in a mathematical formula, it becomes θw=(θt−θm/2). Here, θm is 360/P, θt is 360/S, R is a radius of the rotor, P is a number of poles of the rotor, and S is a number of stator slots.

To be more specific, for example, assuming that the rotor has six poles and the stator has nine stator slot parts, the angle θw that constitutes the width Wo of both ends of each permanent magnet 22 is 10 degrees.

θw=(360/9(the number of stator slots))−(360/6 (the number of poles)/2)

=10

Accordingly, the length Wo of segment, which connect the two points P2 and P3 of the outer circumference of the rotor 20 is configured to satisfy the following formula. As a result, if the number of stator slots and the number of poles of the rotor are identified, the width Wo of both ends of each permanent magnet 22 is changed according to the radius of the rotor 20.

Wo=√(2R×R−2R×R×cos(θt−θm/2))

Here, θm is 360/P, θt is 360/S, R is the radius of the rotor, P is the number of poles of the rotor, and S is the number of stator slots.

For example, assuming that the rotor has six poles and the stator has nine stator slot parts, Wo is √2R²(1−cos(10) and changes according to the radius R of the rotor.

The width Wo of outer circumference side both ends and the width Wc of the middle part of each permanent magnet 22 are configured to satisfy the following formulas:

Wc>Wo×1.0

Wc<Wo×1.6

In the formula 2, if the width Wc of the middle part is less than the width Wo of both ends×1.0, since the two outer surface portions 27 of neighboring permanent magnets are in contact with each other, the width Wo of both ends becomes larger. As a result, the active region A becomes narrower, and an efficiency by magnetic flux saturation is reduced.

In the formula 3, if the width Wc of the middle part is larger than the width Wo of both ends×1.6, since the two outer surface portions 27 of neighboring permanent magnets are in contact with each other, the width Wo of both ends excessively becomes smaller. As a result, the active region A becomes wider, but a substantive magnetic flux of both end sides is lowered and thus an efficiency is reduced.

Figure 6:
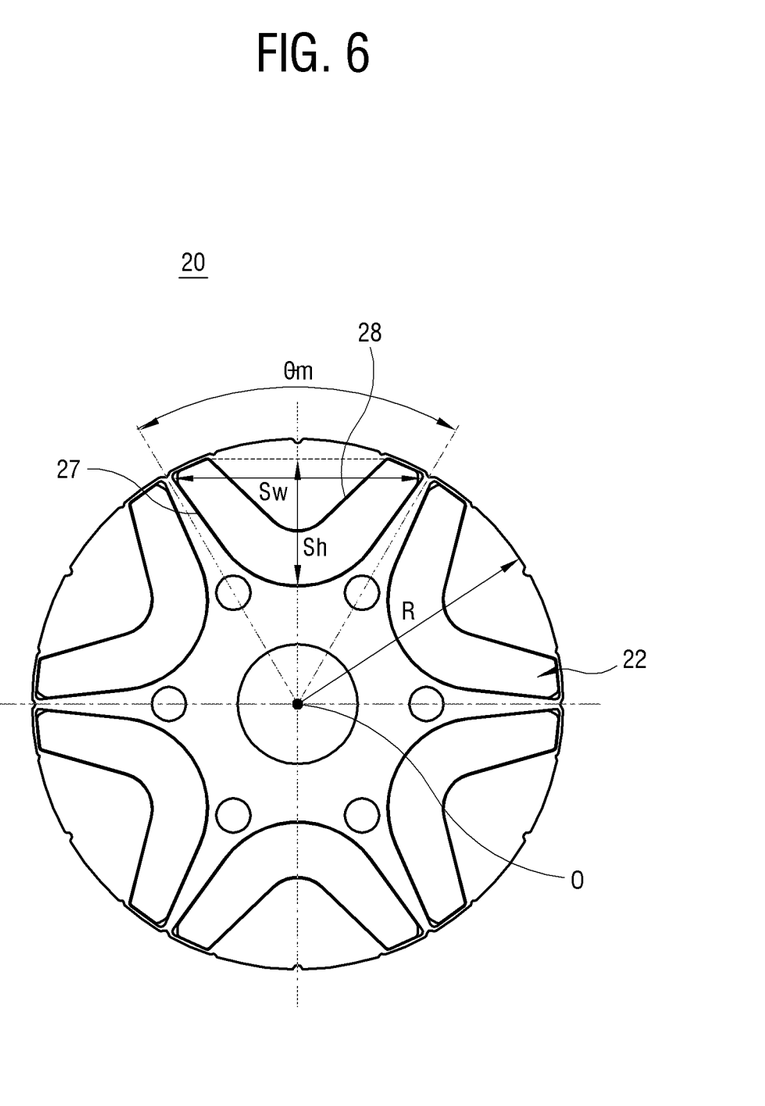

FIG. 6 is a view showing a shape of the rotor 20 according to an embodiment. A maximum width Sw of each permanent magnet 22 is a length of segment L3, which connect two points P4 and P5 of the outer circumference where the lines extended from the both ends of the outer surface portion 27 meet, respectively. The maximum width Sw of the permanent magnets 22 is calculated in the following formula 4:

Sw=√(2R×R−2R×R×cos(θm))

Here, θm is 360/P, and R is the radius of the rotor.

For example, assuming that the rotor has six poles, θm is 60 degrees. Accordingly, the maximum width Sw of the permanent magnets 22, as √(2R²(1−cos(60), is changed according to the radius R of the rotor.

On the basis of the extended lines of passing through the position P1 from the rotation center O, a maximum height Sh and the maximum width Sw of the permanent magnets 22 are configured to satisfy the following formula 5:

Sh=(0.45~0.55)×Sw

In the formula 5, since the two outer surface portions 27 of neighboring permanent magnets are in contact with each other, the maximum width Sw of the permanent magnets is almost fixed. Accordingly, if the height Sh of the permanent magnets is smaller than the maximum width Sw thereof× 0.45, the width Wc of the middle part of each permanent magnet substantially becomes smaller or the active regions A are reduced, thereby reducing the efficiency. There is a structural limitation in increasing the height Sh of the permanent magnets. If the height Sh of the permanent magnets becomes larger than the maximum width Sw thereof×0.55, the two outer surface portions 27 of neighboring permanent magnets should be separated apart from each other to reduce the maximum width Sw of the permanent magnets, and as a result, the active regions A are reduced, thereby reducing the efficiency.

Figure 7:
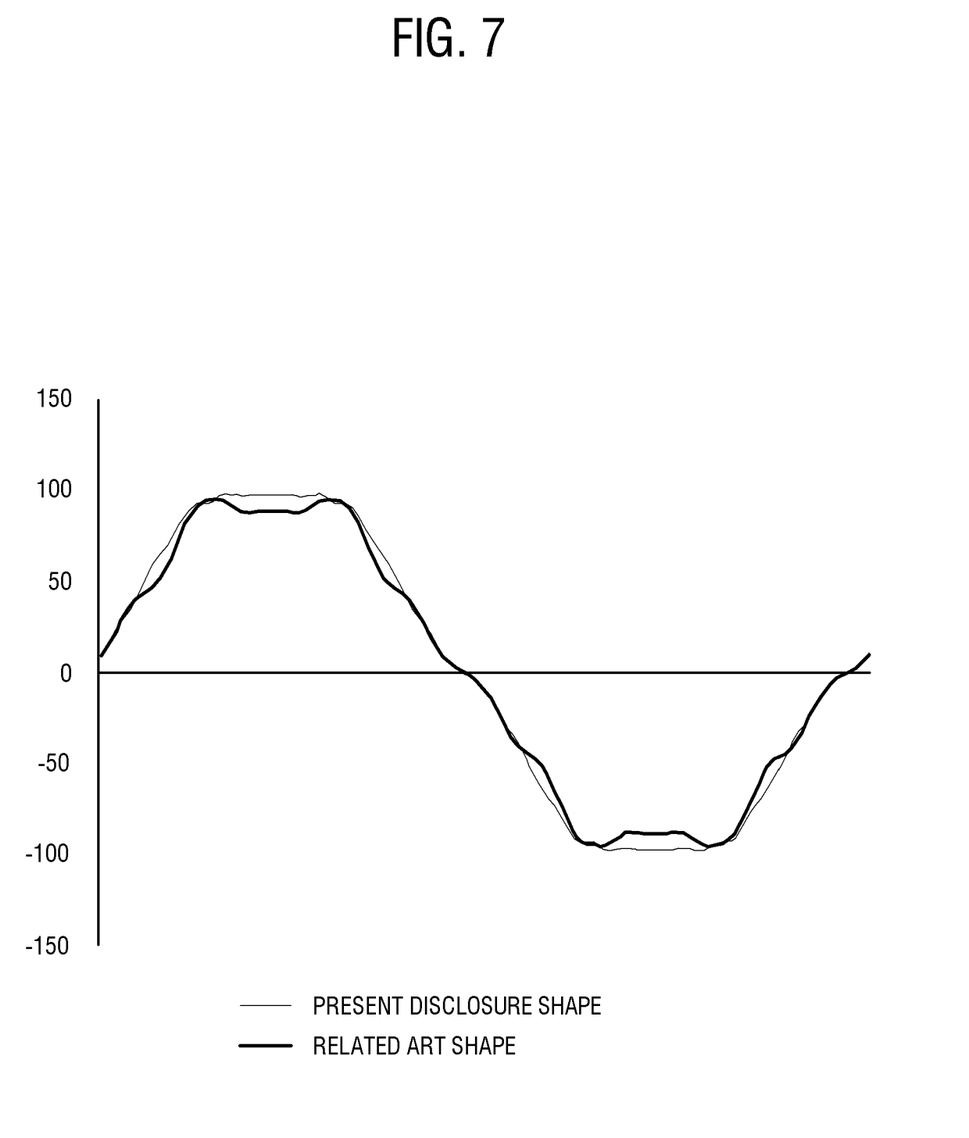
FIG. 7 is a graph comparing a counter electromotive force between the motor according to an embodiment and a motor of related art.

FIG. 7 is a graph comparing a counter electromotive force between the BLDC motor according to an embodiment and a BLDC motor of related art. In the LDC motor according to an embodiment, permanent magnets 22 with relatively low magnetic flux density of 4300 Gauss were applied, and in the BLDC motor of related art, permanent magnets with relatively high magnetic flux density of 4500 Gauss were applied. As shown in FIG. 7, it could have seen that the counter electromotive force of the motor according to an embodiment was 73.2V somewhat higher than 68.7V of the motor of related art even though it has permanent magnets of relatively low quality.

Figure 8:
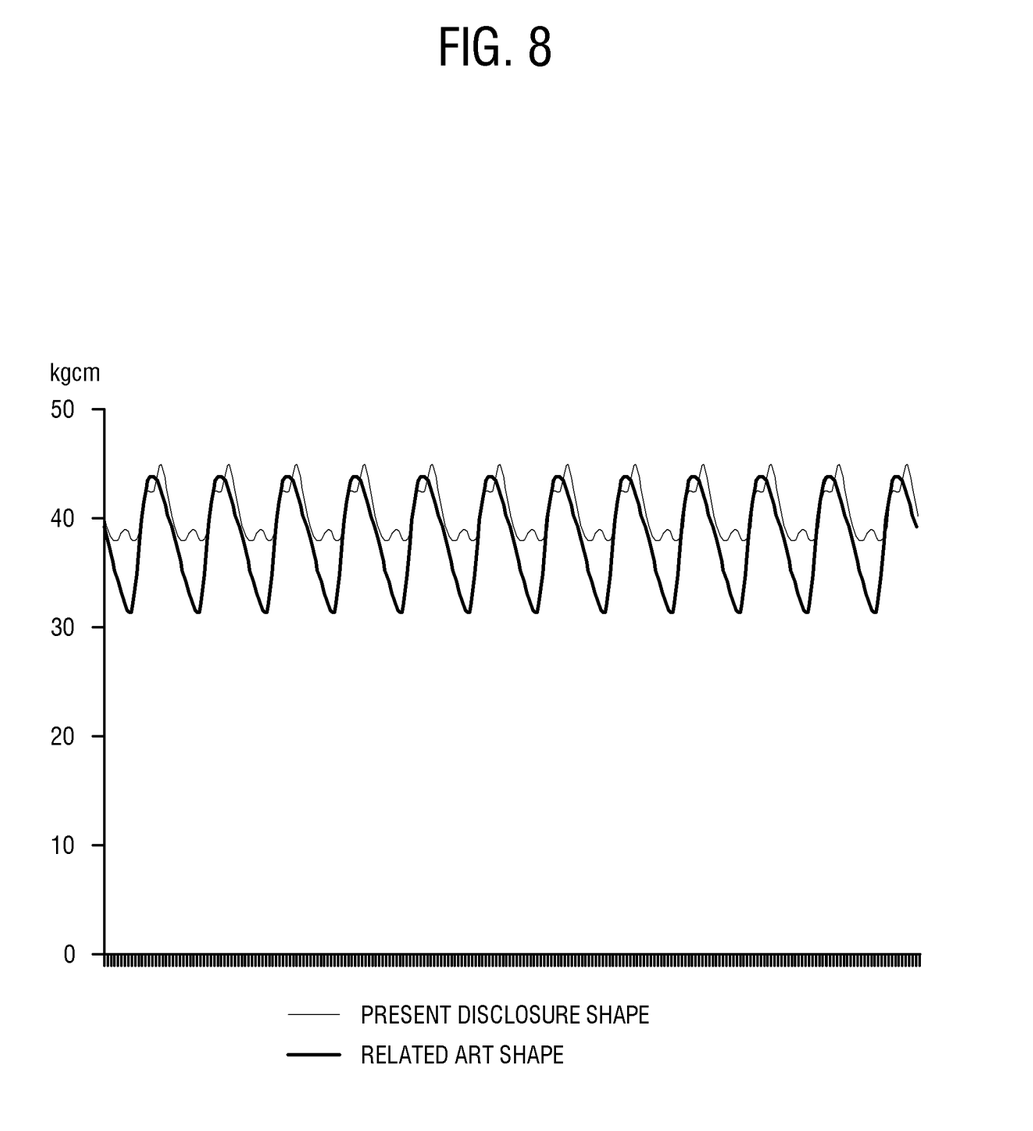
FIG. 8 is a graph comparing a torque ripple between the motor according to an embodiment and the motor of related art.

FIG. 8 is a graph comparing a torque between the BLDC motor according to an embodiment and the BLDC motor of related art. In the LDC motor according to an embodiment, the permanent magnets 22 with the relatively low magnetic flux density of 4300 Gauss were applied, and in the BLDC motor of related art, the permanent magnets with the relatively high magnetic flux density of 4500 Gauss were applied. As shown in FIG. 8, it could have seen that an average torque of the motor according to an embodiment was 40.4 kgcm higher than 38.8 kgcm of the motor of related art and a torque ripple rate of the BLDC motor according to an embodiment was 18% lower than 41% of the motor of related art, even though it has permanent magnets of relatively low quality. The lower torque ripple rate as above provides an effect, which reduces a vibration and a noise of the IPM BLDC motor.

Figure 9:
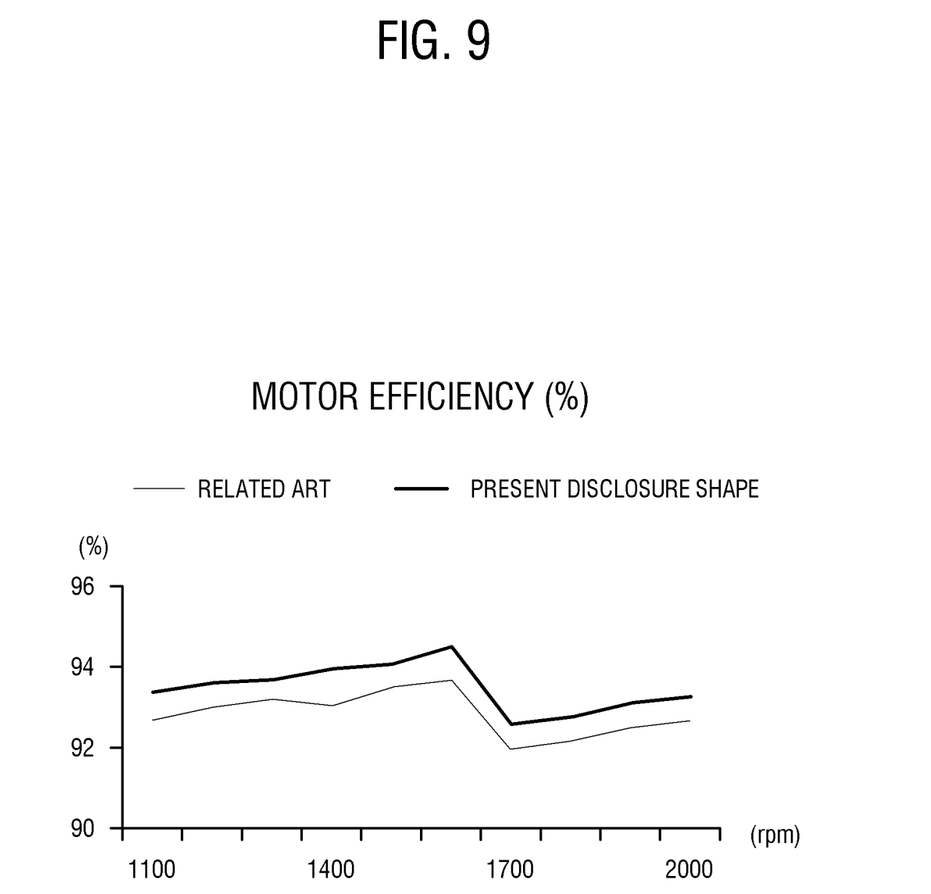
FIG. 9 is a graph comparing an efficiency between the motor according to an embodiment and the motor of related art.

FIG. 9 is a graph comparing an efficiency between the BLDC motor according to an embodiment and the BLDC motor of related art. In the LDC motor according to an embodiment, the permanent magnets 22 with the relatively low magnetic flux density of 4300 Gauss were applied, and in the BLDC motor of related art, the permanent magnets with the relatively high magnetic flux density of 4500 Gauss were applied. As shown in FIG. 9, it could have seen that the efficiency of the motor according to an embodiment was higher by about 1% than the motor of related art even though it has permanent magnets of relatively low quality.

Figure 10:
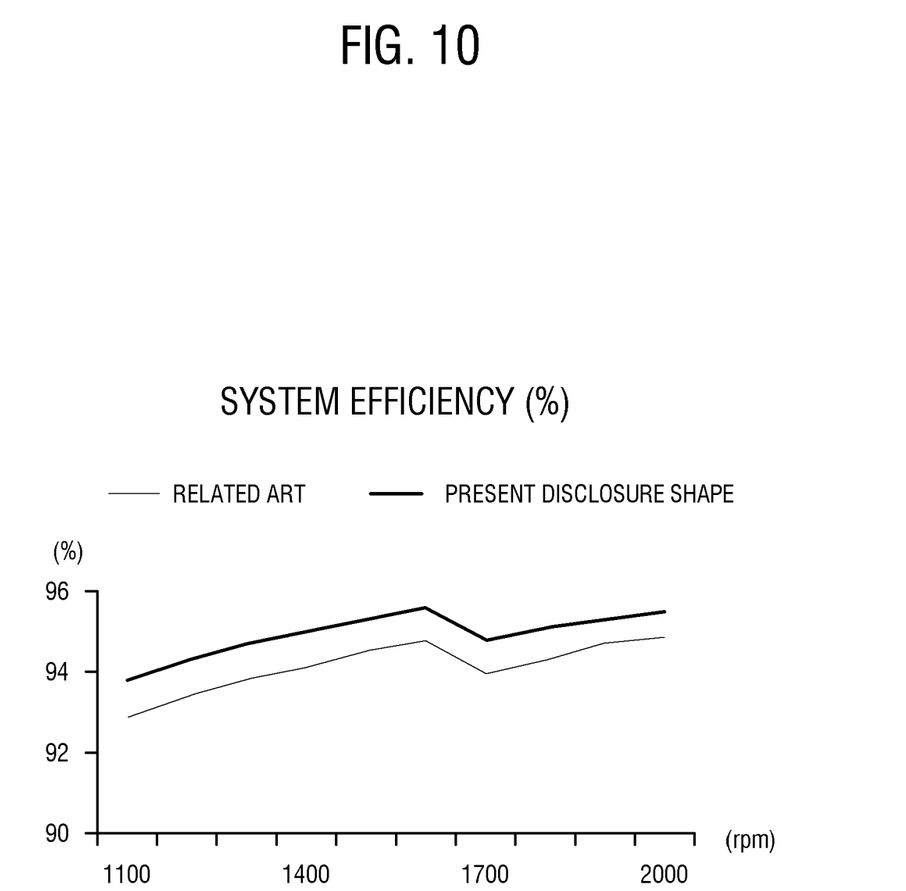
FIG. 10 is a graph comparing an efficiency between a motor system according to an embodiment and a motor system of related art.

FIG. 10 is a graph comparing an efficiency between a BLDC motor system according to an embodiment and a BLDC motor system of related art. Here, the motor system refers to a state in which a controller is added to the motor. In the LDC motor system according to an embodiment, the permanent magnets 22 with the relatively low magnetic flux density of 4300 Gauss were applied, and in the BLDC motor system of related art, the permanent magnets with the relatively high magnetic flux density of 4500 Gauss were applied. As shown in FIG. 10, it could have seen that the efficiency of the motor system according to an embodiment was higher by about 1% than the motor system of related art even though it has permanent magnets of relatively low quality.

Although the present disclosure has been described with various embodiments, various changes and modifications may be suggested to one skilled in the art. It is intended that the present disclosure encompass such changes and modifications as fall within the appended claims.

The invention claimed is:

1. A BLDC motor comprising:
a stator configured in a hollow cylindrical shape and comprising a plurality of teeth around which a plurality of coils is wound to form an electromagnetic field, respectively; and
a rotor configured in a cylindrical shape rotatable within the stator and comprising a plurality of permanent magnets, each having an arched section in which an outer circumference side is extended in both directions from a rotation center side,
wherein the plurality of permanent magnets is disposed so that facing outer surface portions of two permanent magnets neighboring each other are adjacent to each other, and
wherein a width Wo of the outer circumference side of each permanent magnet is configured to be smaller than a width Wc of the rotation center side thereof,
wherein a width Wo of outer circumference side both ends of each permanent magnet is configured to satisfy the following formula:

$$Wo = \sqrt{(2R \times R - 2 \times R \times \cos(\theta t - \theta m/2))}$$

wherein, $\theta m$ is 360/P, $\theta t$ is 360/S, R is a radius of the rotor, P is a number of poles of the rotor, and S is a number of stator slots.

2. The motor according to claim 1,
wherein a width Wc of a rotation center side middle part of each permanent magnet is configured to satisfy the following formula:

$$Wc > Wo \times 1.0.$$

3. The motor according to claim 1,
wherein a width Wc of a rotation center side middle part of each permanent magnet is configured to satisfy the following formula:

$$Wc < Wo \times 1.6.$$

4. A BLDC motor comprising:
a stator configured in a hollow cylindrical shape and comprising a plurality of teeth around which a plurality of coils is wound to form an electromagnetic field, respectively; and
a rotor configured in a cylindrical shape rotatable within the stator and comprising a plurality of permanent magnets, each having an arched section in which an outer circumference side is extended in both directions from a rotation center side,
wherein the plurality of permanent magnets is disposed so that facing outer surface portions of two permanent magnets neighboring each other are adjacent to each other, and
wherein a width Wo of the outer circumference side of each permanent magnet is configured to be smaller than a width Wc of the rotation center side thereof,
wherein, based on an extended line of passing through a middle part of each permanent magnet from a rotation center O of the rotor, a maximum width Sw of each permanent magnet is configured to satisfy the following formula:

$$Sw = \sqrt{(2R \times R - 2R \times R \times \cos(\theta m))}$$

wherein, $\theta m$ is 360/P, and R is a radius of the rotor.

5. The motors according to claim 4,
wherein a maximum height Sh of each permanent magnet is configured to satisfy the following formula:

$$Sh = (0.45 \sim 0.55) \times Sw.$$

* * * * *